（12）United States Patent
Gryaznov et al.

(10) Patent No.: US 10,583,513 B2
(45) Date of Patent: Mar. 10, 2020

(54) WELDED JOINT BETWEEN A FUEL ELEMENT CASING AND A PLUG

(71) Applicant: STATE ATOMIC ENERGY CORPORATION "ROSATOM" ON BEHALF OF THE RUSSIAN FEDERATION, Moscow (RU)

(72) Inventors: Nikolaj Serafimovich Gryaznov, Moscow (RU); Oleg Anatolevich Kruglov, Moscow (RU); Viktor Pavlovich Smirnov, Moscow (RU); Yurij Vasilevich Sorokin, Moscow (RU)

(73) Assignee: State Atomic Energy Corporation "Rosatom" On Behalf Of The Russian Federation (RU)

( * ) Notice: Subject to any disclaimer, the term of this patent is extended or adjusted under 35 U.S.C. 154(b) by 59 days.

(21) Appl. No.: 16/069,864

(22) PCT Filed: Nov. 23, 2016

(86) PCT No.: PCT/RU2016/000807
§ 371 (c)(1),
(2) Date: Jul. 12, 2018

(87) PCT Pub. No.: WO2017/091110
PCT Pub. Date: Jun. 1, 2017

(65) Prior Publication Data
US 2019/0047070 A1 Feb. 14, 2019

(30) Foreign Application Priority Data
Nov. 26, 2015 (RU) ................................ 2015150747

(51) Int. Cl.
*B23K 9/12* (2006.01)
*B23K 9/167* (2006.01)
(Continued)

(52) U.S. Cl.
CPC ............. *B23K 9/167* (2013.01); *B23K 9/16* (2013.01); *B23K 31/02* (2013.01); *G21C 3/04* (2013.01);
(Continued)

(58) Field of Classification Search
CPC ........ B23K 9/028; B23K 9/0288; B23K 9/16; B23K 9/162; B23K 9/167; B23K 31/02;
(Continued)

(56) References Cited

U.S. PATENT DOCUMENTS 2,290,515 A * 7/1942 Williams ............. F16L 55/1116
220/612
2,787,699 A * 4/1957 Jessen ................. B23K 35/3086
219/137 R
(Continued)

FOREIGN PATENT DOCUMENTS

| JP | H0790456 A | 4/1995 |
| JP | 2000158130 A | 6/2000 |
| JP | 2007086010 A | 4/2007 |

OTHER PUBLICATIONS

F. G. Reshetnikova, book 2, capter 20, pp. 183-185, 187, 189, drawing 20.1a, drawing 203a, b;, 1995.

*Primary Examiner* — Hung D Nguyen
(74) *Attorney, Agent, or Firm* — Eric L. Sophir; Dentons US LLP

(57) ABSTRACT

The invention relates to nuclear power and can be used in the manufacture of fuel elements for nuclear reactors. Embodiments of a welded joint between a fuel element casing and a plug comprised of high-chromium steel are proposed, providing for increased durability of the sealing of nuclear reactor fuel elements as a result of the formation of a high quality welded joint between the casing and the plug without the need for subsequent heat treatment of the weld seam, which simplifies the manufacturing process. This is (Continued)

achieved through the formation of a ferrite phase in the metal of the seam by adjusting the structure of a joint between the casing and the plug of ferrite-martensite and ferrite steels in various combinations and by keeping the necessary ranges of the size ratios to ensure the formation of the aforesaid phase.

4 Claims, 4 Drawing Sheets

(51) Int. Cl.
| | |
|---|---|
| B23K 31/02 | (2006.01) |
| G21C 3/07 | (2006.01) |
| G21C 21/02 | (2006.01) |
| B23K 9/16 | (2006.01) |
| G21C 3/04 | (2006.01) |
| G21C 3/10 | (2006.01) |
| B23K 9/00 | (2006.01) |

(52) U.S. Cl.
CPC ............... *G21C 3/07* (2013.01); *G21C 3/10* (2013.01); *G21C 21/02* (2013.01); *Y02E 30/40* (2013.01)

(58) Field of Classification Search
CPC ... G21C 3/04; G21C 3/06; G21C 3/07; G21C 3/10; G21C 3/33; G21C 21/02; Y02E 30/39; Y02E 30/40
USPC ... 219/59.1, 60 R, 69.1, 76.14, 76.15, 78.01, 219/121.11, 125.11, 129, 136, 137 R, 219/148, 125.1
See application file for complete search history.

(56) References Cited

U.S. PATENT DOCUMENTS

| | | | | |
|---|---|---|---|---|
| 3,045,108 | A * | 7/1962 | Stone | G21C 3/10 219/137 R |
| 3,183,066 | A * | 5/1965 | Lessmann | B23K 9/028 428/602 |
| 3,188,446 | A * | 6/1965 | Ray | G21C 3/10 219/72 |
| 3,528,166 | A * | 9/1970 | Portal | B23K 20/00 228/196 |
| 3,725,635 | A * | 4/1973 | Fink | B23K 10/02 219/121.46 |
| 4,003,788 | A * | 1/1977 | Boyko | B23K 28/02 376/451 |
| 4,004,972 | A * | 1/1977 | Mogard | G21C 3/18 376/453 |
| 4,075,454 | A * | 2/1978 | Duncan | G21C 3/10 219/137 R |
| 4,837,419 | A * | 6/1989 | Boatwright | B23K 9/028 219/125.11 |
| 5,319,178 | A * | 6/1994 | Sando | G21C 3/10 219/125.11 |
| 5,513,230 | A * | 4/1996 | Crede | B23K 11/3009 219/103 |
| 5,912,935 | A * | 6/1999 | Isobe | G21C 3/06 376/261 |

* cited by examiner

100
WELDED JOINT BETWEEN A FUEL ELEMENT CASING AND A PLUG

CROSS-REFERENCE TO RELATED APPLICATIONS

This application is a National Stage of PCT/RU2016/000807, filed Nov. 23, 2016 that claims the priority of Russian Patent Application No. 2015150747, filed on Nov. 26, 2015, which are incorporated herein by reference in their entirety for all purposes.

TECHNICAL FIELD

The invention relates to nuclear power and can be used in the manufacture of fuel elements for power reactors.

BACKGROUND

The operational durability of fuel elements is largely determined by the quality of welded joints. Presently, fuel elements for fast-neutron reactors having casings made of high-chromium ferrite-martensite steels are sealed by the method of argon-arc welding (AW) with the use of a non-consumable tungsten electrode.

The known welded joint is comprised of the casing and the plug and has the butt-tool joint with the fusible shoulder arranged on the plug (see the book "Development, production and operation of fuel elements of power reactors" edited by Ph. G. Reshetnikov, vol. 2, Energatomizdat, 1995, pages 185-186, Table 20.1a). These welded joints use materials of the same grade, including high-chromium ferrite-martensite steels. The requirements for welded joints are defined in the Russian Industrial Standard OST 95 503-2006.

The main drawback inherent in welding of high-chromium ferrite-martensite steels is the tendency of these steels form quenching structures and cold cracks after a certain period of time upon completion of the welding.

SUMMARY

To produce high-quality welded joints of such steels, an additional operation of weld joint tempering is required, which is carried out at 740-760° C. for 20-30 min, keeping the time between welding operations and the subsequent tempering as short as possible. Performing this after-welding tempering operation increases the costs and the complexity of the technology of fuel element manufacturing, especially when tempering is applied to the welded seam which seals the fuel element loaded with fuel.

DETAILED DESCRIPTION

Figure 1:
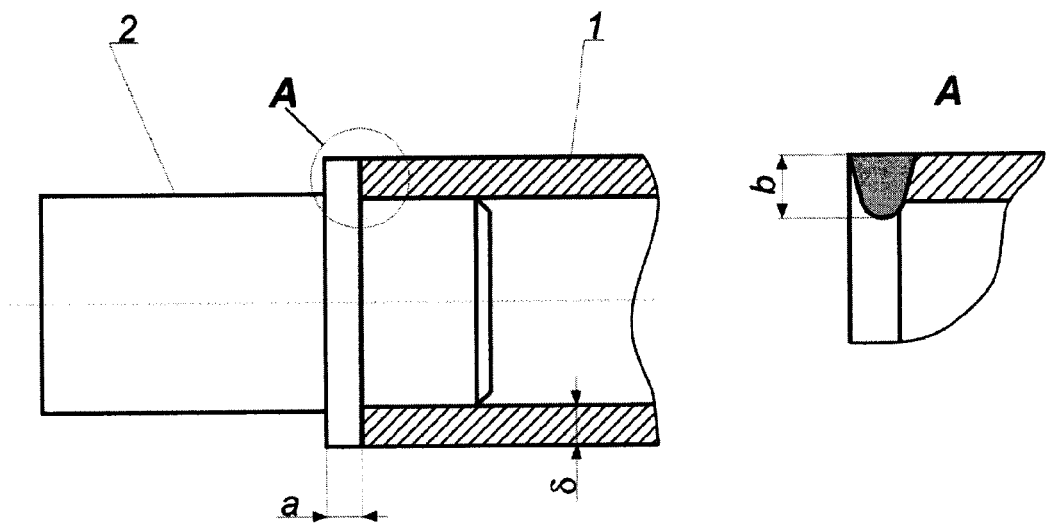
FIG. 1 illustrates an embodiment of the welded joint structure.

The technical effect of the present invention is providing durability of the sealing of nuclear reactor fuel elements with casings made of high-chromium steels by means of providing a high-quality welded joint between a casing and a plug without subsequent heat treatment of the weld seam, which simplifies the manufacturing process.

The technical effect is provided by a welded joint between a fuel element casing and a plug, both made of high-chromium steel and connected by the argon-arc welding method, wherein the casing is made of a ferrite-martensite steel and the plug is made of a ferrite steel, and wherein the parameters of the casing and the plug are selected according to the following ratios:

$$\delta \leq a \leq 2\delta$$

$$\delta \leq b \leq 1.5\delta,$$

where: a is the plug shoulder width,
    b is the penetration depth,
    $\delta$ is the casing thickness.

The technical effect is provided by a welded joint between a fuel element casing and a plug, both made of high-chromium steel and connected by the argon-arc welding method, wherein the casing is a bimetal casing having an outer layer made of a ferrite steel and an inner layer made of a ferrite-martensite steel with the thickness ratio of 1:1 or 1:2, and the plug is made of a ferrite-martensite steel, and wherein the parameters of the casing and the plug are selected according to the following ratios:

$$\delta_1 \leq a \leq 1.5\delta_1$$

$$(\delta_1+\delta_2) \leq b \leq \delta 1.2(\delta_1+\delta_2),$$

where: a is the plug shoulder width,
    b is the penetration depth,
    $\delta_1$ is the thickness of the outer layer of the bimetal casing,
    $\delta_2$ is the thickness of the inner layer of the bimetal casing.

The technical effect is provided by a welded joint between a fuel element casing and a plug, both made of high-chromium steel and connected by the argon-arc welding method, wherein the casing is made of a ferrite-martensite steel and the plug is a bimetal plug having an outer layer made of a ferrite steel and an inner layer made of a ferrite-martensite steel, and wherein the parameters of the casing and the plug are selected according to the following ratios:

$$\delta_1 \leq a \leq 2\delta_1$$

$$0.2\delta \leq \delta_1 \leq 0.5\delta$$

$$(\delta+0.2\delta_1) \leq b \leq (\delta+0.5\delta_1),$$

where: a is the plug shoulder width,
    b is the penetration depth,
    $\delta$ is the casing thickness,
    $\delta_1$ is the thickness of the outer layer of the bimetal plug.

The technical effect is provided by a welded joint between a fuel element casing and a plug, both made of high-chromium steel and connected by the argon-arc welding method, wherein the casing and the plug are made of a high-chromium ferrite-martensite steel and there is a ferrite steel ring between the casing and the plug, with the parameters selected according to the following ratios:

$$0.8\delta \leq a \leq \delta$$

$$\delta \leq b \leq 1.2\delta$$

$$a \leq c \leq 2a,$$

where: a is the plug shoulder width,
    b is the penetration depth,
    c is the ring thickness,
    $\delta$ is the casing thickness.

To form a welded joint a connection scheme is used where relative positions of the casing and the plug, both made of a high-chromium ferrite and ferrite-martensite steel, are being changed leading to the formation of a ferrite phase in a metal of the weld seam, which allows to eliminate the stage of subsequent heat treatment of the weld seam (see the book "Welding in mechanical engineering: Reference manual. In 4 volumes" edited by G. A. Nikolaev et al.—Moscow. Mashinostroenie, 1978—vol. 2/Edited by A. I. Akulova, pages 179-183). Thereby, the manufacturing process of nuclear reactor fuel elements is simplified.

The range of ratios for such parameters as the plug shoulder width, casing thickness (including when a bimetal is used), ring thickness and penetration depth is selected as a necessary condition for obtaining a ferrite phase in a metal of the welded joint seam.

FIG. 1 illustrates an embodiment of the welded joint structure comprising a casing 1 made of a ferrite-martensite steel and a plug 2 made of a ferrite steel.

To obtain a ferrite phase in the metal of the weld seam according to this embodiment of the welded joint structure it is required to follow the parameters selected according to the following ratios:

$$\delta \leq a \leq 2\delta$$

$$\delta \leq b \leq 1.2\delta$$

where: a is the plug shoulder width,
b is the penetration depth,
δ is the casing thickness.

Figure 2:
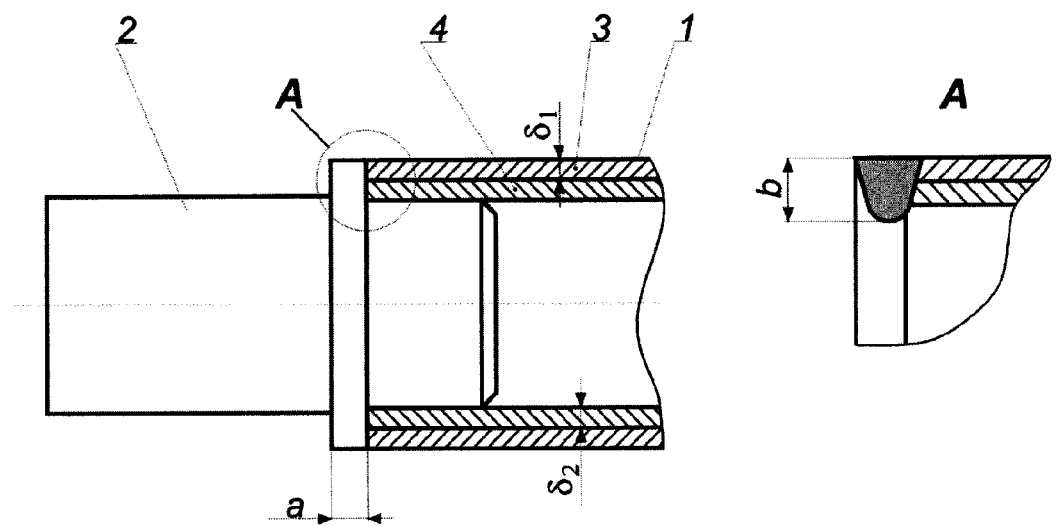
FIG. 2 illustrates another embodiment of the welded joint structure.

FIG. 2 illustrates another embodiment of the welded joint structure comprising a bimetal casing 1, an outer layer 3 made of a ferrite steel, an inner layer 4 made of a ferrite-martensite steel and a plug 2 made of a ferrite-martensite steel.

To obtain a ferrite phase in the metal of the weld seam according to this embodiment of the welded joint structure it is required to follow the parameters selected according to the following ratios:

$$\delta_1 \leq a \leq 1.5\delta_1$$

$$(\delta_1+\delta_2) \leq b \leq 1.2(\delta_1+\delta_2),$$

where a is the plug shoulder width,
b is the penetration depth,
$\delta_1$ is the thickness of the outer layer of the bimetal casing,
$\delta_2$ is the thickness of the inner layer of the bimetal casing.

Figure 3:
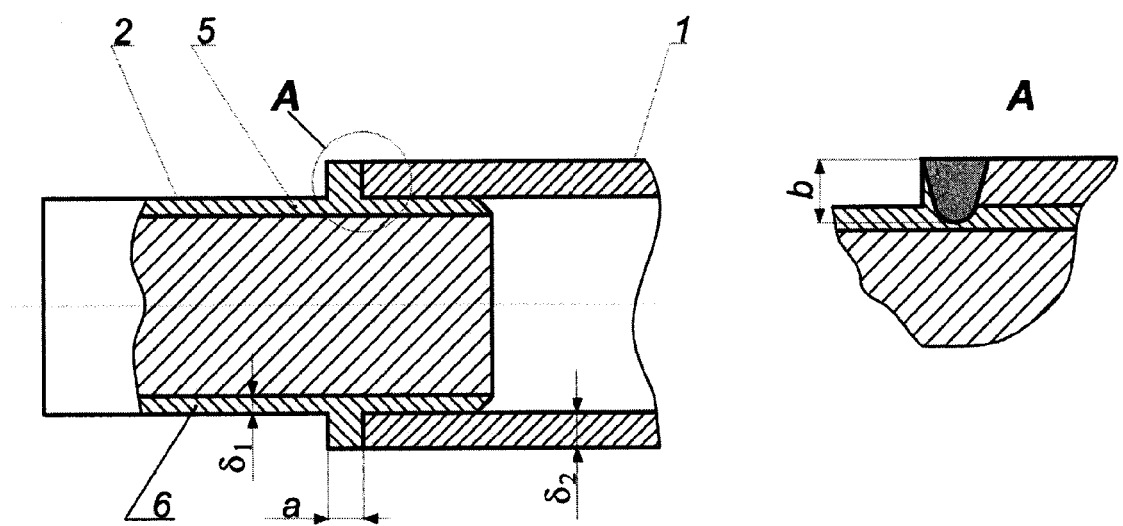
FIG. 3 illustrates another embodiment of the welded joint structure.

FIG. 3 illustrates another embodiment of the welded joint structure comprising a casing 1 made of a ferrite-martensite steel and a bimetal plug 2, an outer layer 5 of the bimetal plug 2 comprised of a ferrite steel and an inner layer 6 of the bimetal plug 2 comprised of a ferrite-martensite steel.

To obtain a ferrite phase in the metal of the weld seam of this embodiment of the welded joint structure it is required to follow the parameters selected according to the following ratios:

$$\delta_1 \leq a \leq 2\delta_1$$

$$0.2\delta \leq \delta_1 \leq 0.5\delta$$

$$(\delta+0.2\delta_1) \leq b \leq (\delta+0.5\delta_1),$$

where a is the plug shoulder width,
b is the penetration depth,
δ is the casing thickness,
$\delta_1$ is the thickness of the outer layer of the bimetal plug.

Figure 4:
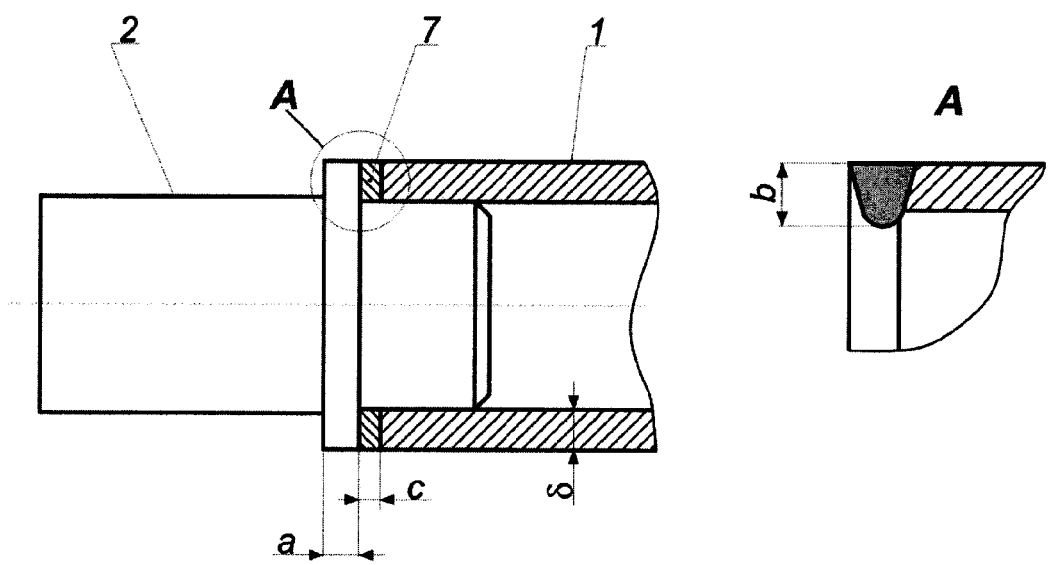
FIG. 4 illustrates another embodiment of the welded joint structure.

FIG. 4 illustrates another embodiment of the welded joint structure comprising a casing 1 and a plug 2 made of ferrite-martensite steel, and a ring 7 made of ferrite steel and placed between the casing and the plug in the welded joint area.

To obtain a ferrite phase in the metal of the weld seam of this embodiment of the welded joint structure it is required to follow the parameters selected according to the following ratios:

$$0.8\delta \leq a \leq \delta$$

$$\delta \leq b \leq 1.2\delta$$

$$a \leq c \leq 2a$$

where a is the plug shoulder width,
b is the penetration depth,
c is the ring thickness,
δ is the casing thickness.

When developing the welded joints and calculating essential structural parameters thereof, such as a plug shoulder width, a casing wall thickness and a penetration depth, the following technological characteristics have been taken into account:
the casing thickness is from 0.4 to 0.5 mm,
the shoulder width is from 0.2 to 1 mm,
the penetration depth is no less than the casing thickness and no more than the casing thickness by 1.2 times,
the location of an electrode axis at a butt area between the casing and the plug.

Welding modes providing the desired quality of the welded joint with the predetermined phase composition of a metal of the weld seam in the structures according to the present invention are the following:
welding current is 14-20 A,
welding rate is 12-15 m/h,
arc voltage is 9-10 V,
argon flow rate 7-8 l/min.

EXAMPLE 1

The fuel element casing was made of ferrite-martensite steel ЭП-823 (16Cr12MoWSiVNbB), the diameter of the casing was 9.3 mm and the wall thickness was 0.5 mm, the plug was made of ferrite steel 05Х18С2ВФАЮ (05Cr18Si2WVNAl) (RU Patent 2238345 "Steel for core fuel elements of lead-coolant nuclear reactors"/ Velyuhanov V. P., Zelenskiy G. K., Ioltuhovskiy A. G., Leontieva-Smirnova M. V., Mitin V. S., Sokolov N. B., Rusanov A. E., Troyanov V. M.; the applicant and the patent holder—Russian Federation represented by Federal Agency on Atomic Energy, SSC VNIINM.; publ. 20, Oct. 2004.), the shoulder in the plug was of 0.8 mm width and the diameter of the shoulder corresponded to the casing diameter (see FIG. 1).

The fuel element was sealed according to the AW method with the following parameters:
welding current 15 A,
welding velocity 14 m/h,
arc voltage 9 V,
argon rate 8 l/min.

EXAMPLE 2

The fuel element casing was the bimetal casing of the 0.5 mm thickness having the outer layer made of steel 05Х18С2МВФАЮ (05Cr18Si2MoWVNAl) and the inner layer made of steel ЭП-823 (16Cr12MoWSiVNbB), wherein the thickness ratio was 1:2. The plug was made of steel ЭП-823 (16Cr12MoWSiVNbB), and the shoulder was of 0.8 mm width (see FIG. 2). The casing and the plug were welded together following the same parameters as in Example 1.

EXAMPLE 3

The fuel element casing was made of steel ЭП-823 (16Cr12MoWSiVNbB) having the 0.5 mm thickness, the outer layer of the bimetal plug was made of steel 05Х18С2МВФАЮ (05Cr18Si2MoWVNAl) and the inner layer of the bimetal plug was made of steel ЭП-823 (16Cr12MoWSiVNbB) (see FIG. 3). The thickness of the plug outer layer made of steel 05Х18С2 МВФАЮ (05Cr18Si2MoWVNAl) in the welding area was 0.2 mm. The casing and the plug were welded together following the same parameters as in Example 1.

EXAMPLE 4

The casing and the plug were made of steel ЭП-823 (16Cr12MoWSiVNbB). The casing was of 0.4 mm thickness, and the plug shoulder was of 0.45 mm thickness. The ring made of steel 05Х18С2 МВФАЮ (05Cr18Si2MoWVNAl) having the thickness of 0.75 mm was placed between the plug shoulder and the casing (see FIG. 4). The welding mode was the same as in Example 1.

According to the technology described above, fuel element simulators were made.

Metallographic researches of the welded joint according to the various embodiments shown in FIGS. 1-4 and based on the selected technological parameters have shown that in all embodiments of the welded joint the ferrite phase was created in the metal of the weld seam.

Table 1 represents mechanical characteristics of the welded joint according to the embodiments of joint structures according to the present invention.

Mechanical strength tests have shown that the rupture of the samples occurs across the casing of fuel element simulators.

Weld joints have been tested for corrosion in lead coolant for 4000 hours. It has been found that the corrosion resistance of weld joints remains at the level of corrosion resistance of the fuel casing.

TABLE 1

Mechanical characteristics of welded joints

| Welded joint structure | Ratio of bimetal casing thicknesses | Experimental temperatures, ° C. | Tensile strength, $\sigma_B$ MPa | Destruction point |
|---|---|---|---|---|
| FIG. 1 | — | 20 | 818 | along the casing |
| FIG. 2 | 1:1 | 20 | 695 | along the casing |
| FIG. 2 | 1:2 | 20 | 728 | along the casing |
| FIG. 3 | — | 20 | 815 | along the casing |
| FIG. 4 | — | 20 | 821 | along the casing |

The tests of the welded joints for leak resistance carried out using a helium leak detector by a mass spectroscopic method at a room temperature have shown that all joints are hermetically sealed.

The use of the embodiments of the welded joint between the casing and the plug made of high-chromium steels will improve their quality and will significantly simplify the manufacturing process.

What is claimed is:

1. A welded joint between a fuel element casing and a plug, both comprised of high-chromium steel and coupled to each other by means of the argon-arc welding, characterized in that the fuel element casing is comprised of a ferrite-martensite steel and the plug is comprised of a ferrite steel, wherein the fuel element casing and the plug have characteristics selected according to the following ratios:

$\delta \leq a \leq 2\delta$ $\delta \leq b \leq 1.5\delta$, where a is the plug shoulder width,
b is the penetration depth, and
δ is the fuel element casing thickness.

2. A welded joint between a fuel element casing and a plug, both comprised of high-chromium steel and coupled to each other by means of the argon-arc welding, characterized in that the fuel element casing is a bimetal casing having an outer layer comprised of a ferrite steel and an inner layer comprised of a ferrite-martensite steel with the thickness ratio of 1:1 or 1:2, and the plug is comprised of a ferrite-martensite steel, wherein the fuel element casing and the plug have characteristics selected according to the following ratios:

$\delta_1 \leq a \leq 1.5\delta_1$ $(\delta_1+\delta_2) \leq b \leq 1.2(\delta_1+\delta_2)$, where a is the plug shoulder width,
b is the penetration depth,
$\delta_1$ is the thickness of the outer layer of the bimetal casing, and
$\delta_2$ is the thickness of the inner layer of the bimetal casing.

3. A welded joint between a fuel element casing and a plug, both comprised of high-chromium steel and coupled to each other by means of the argon-arc welding, characterized in that the fuel element casing is made of a ferrite-martensite steel and the plug is a bimetal plug having an outer layer comprised of a ferrite steel and an inner layer comprised of a ferrite-martensite steel, wherein the fuel element casing and the plug and have characteristics selected according to the following ratios:

$\delta_1 \leq a \leq 2\delta_1$ $0.2\delta \leq \delta_1 \leq 0.5\delta$ $(\delta+0.2\delta_1) \leq b \leq (\delta+0.5\delta_1)$, where a is the plug shoulder width,
b is the penetration depth,
δ is the fuel element casing thickness, and
$\delta_1$ is the thickness of the outer layer of the bimetal plug.

4. A welded joint between a fuel element casing and a plug, both comprised of high-chromium steel and coupled to each other by means of the argon-arc welding, characterized in that the fuel element casing and the plug are comprised of ferrite-martensite steel, and a ring of a ferrite steel is placed between the fuel element casing and the plug, wherein the casing, the plug and the ring have characteristics selected according to the following ratios:

$0.8\delta \leq a \leq \delta$ $\delta \leq b \leq 1.2\delta$ $a \leq c \leq 2a$, where a is the plug shoulder width,
b is the penetration depth,
c is the ring thickness, and
δ is the fuel element casing thickness.

* * * * *